(12) United States Patent
Kim et al.

(10) Patent No.: US 7,923,888 B2
(45) Date of Patent: Apr. 12, 2011

(54) SWITCHED RELUCTANCE MOTOR

(75) Inventors: Sang-Young Kim, Gyeonggi-Do (KR); Jun-Young Lim, Incheon (KR)

(73) Assignee: LG Electronics Inc., Seoul (KR)

( * ) Notice: Subject to any disclaimer, the term of this patent is extended or adjusted under 35 U.S.C. 154(b) by 478 days.

(21) Appl. No.: 12/088,248

(22) PCT Filed: Oct. 19, 2006

(86) PCT No.: PCT/KR2006/004250
§ 371 (c)(1),
(2), (4) Date: Mar. 27, 2008

(87) PCT Pub. No.: WO2008/047959
PCT Pub. Date: Apr. 24, 2008

(65) Prior Publication Data
US 2010/0148598 A1    Jun. 17, 2010

(51) Int. Cl.
*H02K 1/06* (2006.01)
(52) U.S. Cl. .................. 310/216.075; 310/166
(58) Field of Classification Search .......... 310/166–168, 310/171, 269, 216.73–75
See application file for complete search history.

(56) References Cited

U.S. PATENT DOCUMENTS

| | | | | |
|---|---|---|---|---|
| 5,294,856 A * | 3/1994 | Horst | ............................. | 310/181 |
| 5,619,113 A * | 4/1997 | Bahn | .............................. | 318/701 |
| 5,844,343 A * | 12/1998 | Horst | ............................. | 310/184 |
| 6,005,321 A * | 12/1999 | Bolton et al. | ................. | 310/168 |
| 6,072,260 A * | 6/2000 | Randall | .................. | 310/216.092 |
| 6,093,993 A * | 7/2000 | McClelland | .................. | 310/168 |
| 6,621,189 B1 | 9/2003 | Flynn | | |
| 7,095,150 B2 * | 8/2006 | Norell et al. | .................. | 310/194 |
| 7,342,339 B2 * | 3/2008 | Norell et al. | .................. | 310/166 |
| 7,420,308 B2 * | 9/2008 | Ramu et al. | ..................... | 310/187 |
| 7,429,840 B2 * | 9/2008 | Pollock et al. | ............. | 318/254.1 |
| 2004/0036440 A1 | 2/2004 | Kim et al. | | |
| 2004/0061472 A1 | 4/2004 | Won et al. | | |
| 2006/0284512 A1 | 12/2006 | Lee et al. | | |
| 2007/0120434 A1 | 5/2007 | Oh et al. | | |
| 2007/0257633 A1 | 11/2007 | Won et al. | | |

* cited by examiner

*Primary Examiner* — Thanh Lam
(74) *Attorney, Agent, or Firm* — Ked & Associates LLP

(57) ABSTRACT

Disclosed is a switched reluctance motor which can reduce noise and prevent overheating in rotation of a rotor. The switched reluctance motor includes: a stator core having a plurality of inwardly protruded poles at predetermined intervals; coils wound around the protruded poles of the stator core; and a rotor core being rotatably housed inside the stator core with a predetermined gap, and having a plurality of outwardly protruded poles along the radial direction, and round units protruded from the front ends of each protruded pole of the rotor core starting to meet each protruded pole of the stator core, so that gaps between the protruded poles of the stator core and the protruded poles of the rotor core can be gradually reduced.

5 Claims, 4 Drawing Sheets

SWITCHED RELUCTANCE MOTOR

TECHNICAL FIELD

The present invention relates to a switched reluctance motor, and more particularly, to a switched reluctance motor which can reduce noise of blade passage frequency (BPF) elements generated by rotation of a rotor and prevent overheating of a motor.

BACKGROUND ART

A switched reluctance motor is more advantageous in simple structure, low cost, high torque density and high efficiency than a general motor. However, the switched reluctance motor has a disadvantage in that vibration noise increases by torque pulsation.

In the switched reluctance motor, both a stator and a rotor include a plurality of poles or teeth. The stator includes coils wound, but the rotor does not include a coil or magnet.

The coils of the facing teeth of the stator are connected in series to each other. When the position of the rotor is detected and the current of each phase is on or off, the rotor is rotated.

FIG. 1 is a cross-sectional view illustrating a conventional switched reluctance motor.

Referring to FIG. 1, the conventional switched reluctance motor includes a stator 10 fixedly installed in a motor housing or frame (not shown), a rotor 20 rotatably inserted into the stator 10, and a rotating shaft 30 pressed in the center portion of the rotor 20.

The stator 10 includes a stator core 11 formed by laminating a plurality of steel sheets, a housing hole 11a formed at the center portion of the stator core 11, a plurality of protruded poles 11b inwardly protruded to the housing hole 11a along the radial direction, and formed at interval from each other at predetermined intervals along the circumferential direction, and coils 12 wound around the protruded poles 11b, for generating electromagnetic force by applied power.

The rotor 20 includes a rotor core 21 formed by laminating a plurality of steel sheets. Here, the plurality of steel sheets each respectively have a shaft hole 21a at their center portions to house the rotating shaft 30, and also have a plurality of outwardly protruded poles 21b on the circumference of the shaft hole 21a along the radial direction.

The conventional switched reluctance motor produces noise by BPF elements generated by the shape of the rotor core 21 in the rotation of the rotor core 21, namely, the BPF elements generated when the protruded poles 11b of the stator core 11 and the protruded poles 21b of the rotor core 21 meet each other in the rotation of the rotor core 21.

To solve the foregoing problem, there has been suggested a structure of reducing the BPF elements generated in the rotation of the rotor core 21, by forming resin formation units 40 by filling synthetic resin in slots 11c formed between the protruded poles 11b of the stator core 11.

However, in this structure, air passages between the rotor core 21 and the stator core 11 are blocked by the resin formation units 40 formed inside the slots 11c. Accordingly, heat generated in the rotation of the rotor core 21 is not sufficiently emitted, thereby overheating the coils 12 and the rotor core 21. As a result, efficiency and performance of the motor are reduced.

DISCLOSURE OF THE INVENTION

Therefore, an object of the present invention is to provide a switched reluctance motor which can gradually vary gaps between a stator core and a rotor core to reduce noise of BPF elements generated when protruded poles of the stator core and protruded poles of the rotor core meet each other in rotation of a rotor.

Another object of the present invention is to provide a switched reluctance motor which can prevent overheating by securing air passages without filling resin.

To achieve these and other advantages and in accordance with the purpose of the present invention, as embodied and broadly described herein, there is provided a switched reluctance motor, including: a stator core having a plurality of inwardly protruded poles at predetermined intervals; coils wound around the protruded poles of the stator core; and a rotor core being rotatably housed inside the stator core with a predetermined gap, and having a plurality of outwardly protruded poles along the radial direction, and round units protruded from the front ends of each protruded pole of the rotor core starting to meet each protruded pole of the stator core, so that gaps between the protruded poles of the stator core and the protruded poles of the rotor core can be gradually reduced.

In this configuration, the gaps in the overlapping portions of the stator core and the rotor core are not sharply but gradually varied, thereby reducing BPF elements, namely, noise elements generated by the rotation of the rotor. A torque is not sharply varied in the overlapping portions of the stator core and the rotor core, either. Accordingly, noise caused by sharp variations of the torque can also be reduced.

Each of the round units includes a plurality of round units having different curvature.

The round units include: first round units formed at the front ends of the protruded poles of the rotor core in the rotating direction of the rotor core; and second round units formed to have larger curvature than the first round units, and connected to the rear ends of the first round units in the rotating direction of the rotor core.

Preferably, the rotor core is rotated in one direction.

On the other hand, the rotor core is asymmetrical to a straight line passing through a rotation center thereof.

The round units are protruded along the rotating direction of the rotor core.

The round units can be protruded in an elliptical shape.

In addition, there is provided a switched reluctance motor, including: a stator core having a plurality of protruded poles; coils wound around the protruded poles of the stator core; and a rotor core being housed inside the protruded poles of the stator core with a predetermined gap, and having a plurality of protruded poles rotated in one direction, round units protruded along the rotating direction of the rotor core being formed at the front ends of each protruded pole of the rotor core starting to meet each protruded pole of the stator core in the rotation of the protruded poles of the rotor core.

Accordingly, the switched reluctance motor can prevent overheating by temperature rise, by securing the air passages without filling resin in the spaces between the protruded poles of the stator core and the spaces between the protruded poles of the rotor core.

The round units are more protruded than extended lines of straight line units of the protruded poles opposite to the protruded poles having the round units.

On the other hand, preferably, the rotor core is asymmetrical to a straight line passing through a rotation center thereof.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODES FOR CARRYING OUT THE PREFERRED EMBODIMENTS

Reference will now be made in detail to the preferred embodiments of the present invention, examples of which are illustrated in the accompanying drawings.

Hereinafter, a switched reluctance motor according to the present invention will be explained in more detail with reference to the attached drawings.

Figure 3:
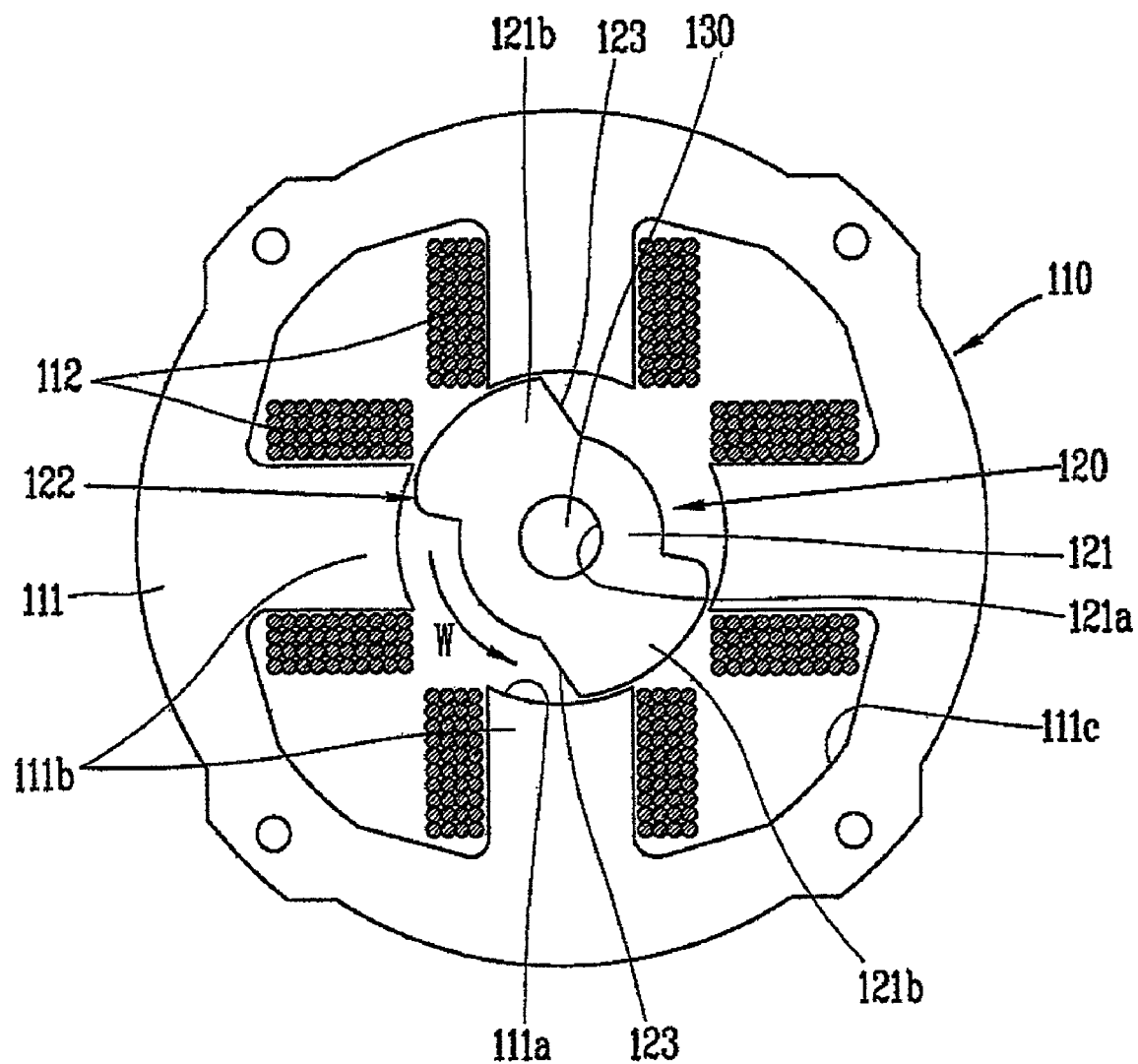
FIG. 3 is a cross-sectional view illustrating a switched reluctance motor in accordance with the present invention.
Figure 4:
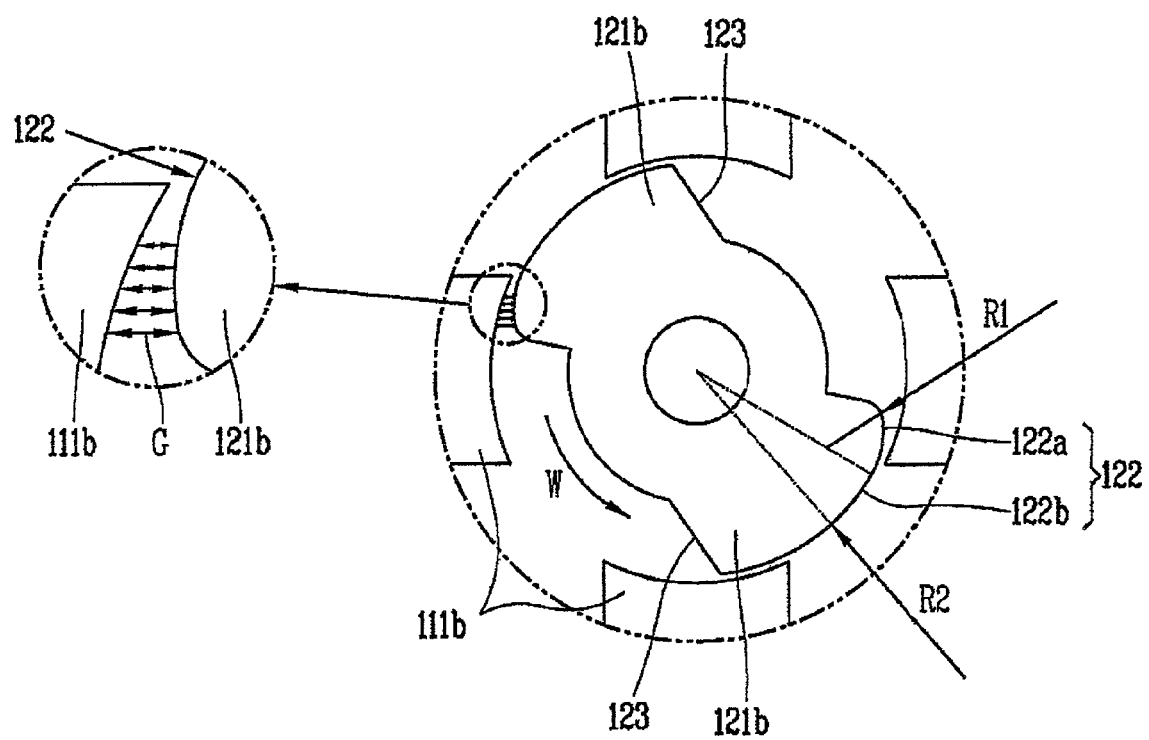
FIG. 4 is an enlarged view illustrating major elements of FIG. 3.

FIG. 3 is a cross-sectional view illustrating the switched reluctance motor in accordance with the present invention, and FIG. 4 is an enlarged view illustrating major elements of FIG. 3.

Also, well-known functions or constructions are not described in detail since they would obscure the invention in unnecessary detail.

As illustrated in FIGS. 3 and 4, the switched reluctance motor includes a stator 110 fixedly installed in a motor housing or frame (not shown), a rotor 120 rotatably inserted into the stator 110, and a rotating shaft 130 pressed in the center portion of the rotor 120.

The stator 110 includes a stator core 111 formed by laminating a plurality of steel sheets, a housing hole 111a formed at the center portion of the stator core 111, a plurality of protruded poles 111b inwardly protruded to the housing hole 111a along the radial direction, and formed at interval from each other at predetermined intervals along the circumferential direction, and coils 112 wound around the protruded poles 111b, for generating electromagnetic force by applied power.

The rotor 120 includes a rotor core 121 rotatably housed in the stator core 111 with a predetermined gap, and formed by laminating a plurality of steel sheets. The plurality of steel sheets each respectively have a shaft hole 121a at their center portions to house the rotating shaft 130, and also have a plurality of outwardly protruded poles 121b on the circumference of the shaft hole 121a along the radial direction.

Here, the rotor core 121 and the protruded poles 121b are rotated in one direction W.

Round units 122 are protruded from the front ends of the protruded poles 121b of the rotor core 121 in the rotating direction W of the rotor core 121, so that gaps G between the protruded poles 121b of the rotor core 121 and the protruded poles 111b of the stator core 111 can be gradually reduced in the rotation of the rotor core 121.

The round units 122 are protruded along the rotating direction W of the rotor core 121. More specifically, the round units 122 are protruded from the front ends of each protruded pole 121b of the rotor core 121 starting to meet each protruded pole 111b of the stator core 111 in the rotation of the rotor core 121.

Accordingly, the rotor core 121 is asymmetrical to a straight line passing through a rotation center thereof.

That is, since the round units 122 are more protruded than extended lines of straight line units 123 of the protruded poles 121b opposite to the protruded poles 121b having the round units 122, the round units 122 are asymmetrical to the extended lines.

On the other hand, each of the round units 122 can be composed of a plurality of round units having different curvature. It is presumed that each of the round units 122 includes a first round unit and a second round unit having different curvature.

The first round units 122a having predetermined curvature R1 are formed at the front ends of the protruded poles 121b of the rotor core 121 in the rotating direction W of the rotor core 121, and the second round units 122b having curvature R2 relatively larger than the curvature R1 of the first round units 122a are continuously connected to the rear ends of the first round units 122a in the rotating direction W of the rotor core 121.

In addition to the plurality of round units 122a and 122b having different curvature, the round units 122 can be formed in an elliptical shape. The round units 122a and 122b formed at the front ends of the protruded poles 121b of the rotor core 121 in the rotating direction W of the rotor core 121 serve to gradually slowly vary the gaps G formed between the protruded poles 121b of the rotor core 121 and the protruded poles 111b of the stator core 111 in the rotation of the rotor core 121.

That is, the gaps G formed between the protruded poles 111b of the stator core 111 and the protruded poles 121b of the rotor core 121 starting to meet the protruded poles 111b of the stator core 111 are gradually reduced and then constantly maintained by forming the round units 122.

Figure 1:
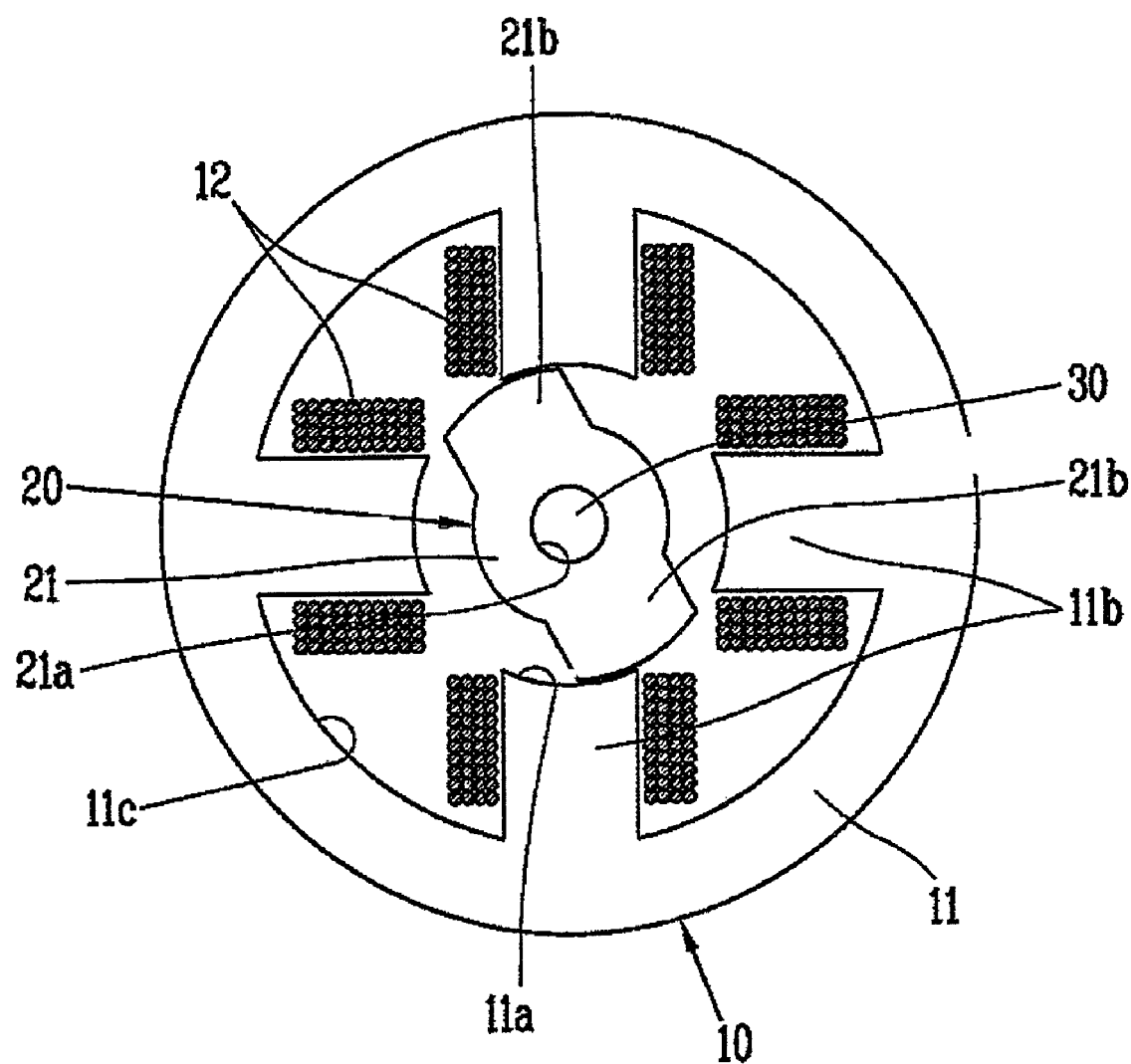
FIG. 1 is a cross-sectional view illustrating one example of a conventional switched reluctance motor.
Figure 2:
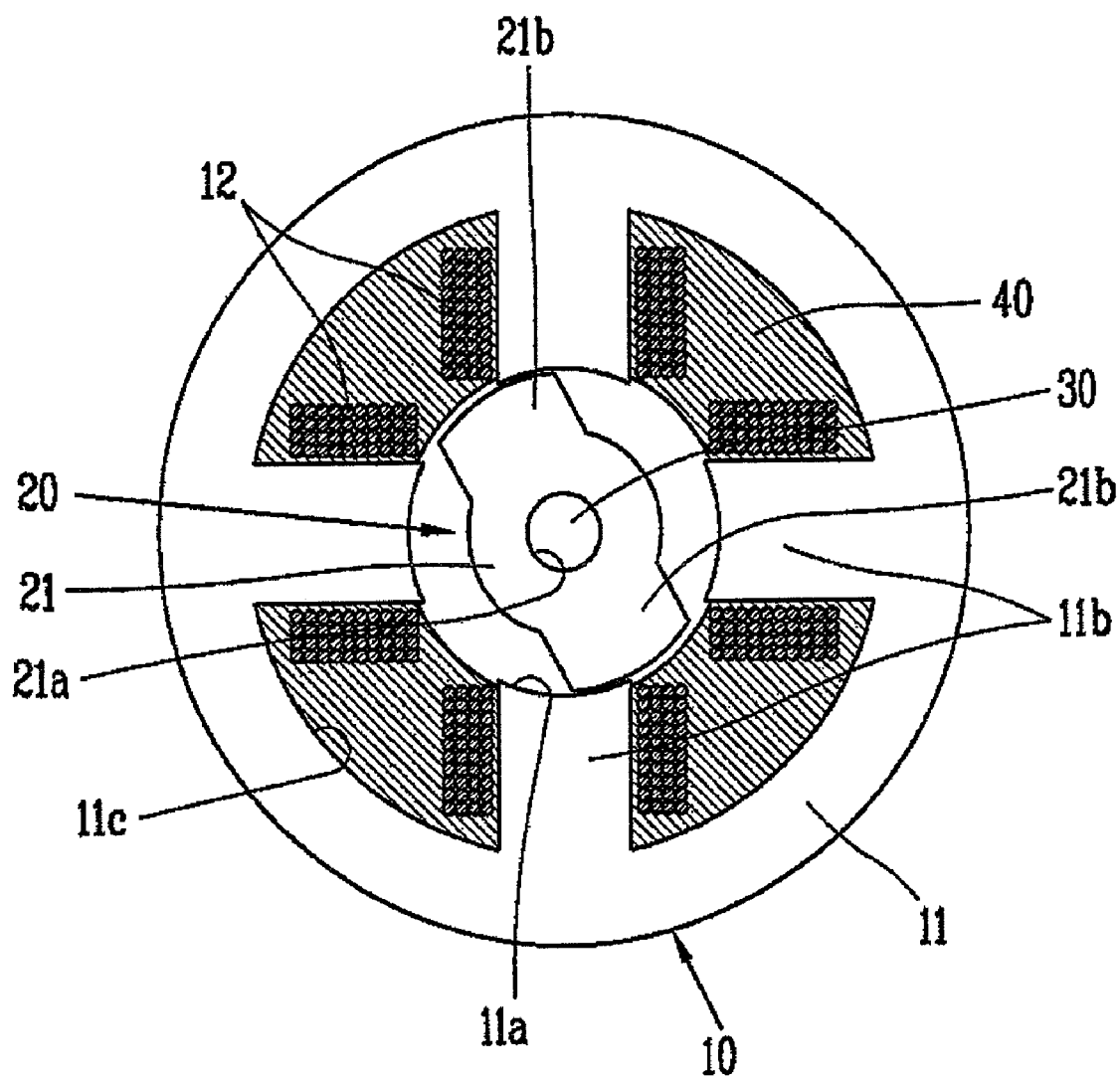
FIG. 2 is a cross-sectional view illustrating another example of the conventional switched reluctance motor.

Accordingly, the switched reluctance motor reduces noise caused by the BPF elements generated by the shape of the rotor core 121 in the rotation of the rotor core 121, namely, the BPF elements generated when the protruded poles 111b of the stator core 111 and the protruded poles 121b of the rotor core 121 meet each other in the rotation of the rotor core 21. The switched reluctance motor prevents sharp variations of an inductance in the contact portions of the protruded poles 111b of the stator core 111 and the protruded poles 121b of the rotor core 121 in the rotation of the rotor core 121. As a result, the switched reluctance motor restricts sharp variations of a torque and resulting noise by sharp variations of the inductance. In the switched reluctance motor, in order to reduce the BPF elements generated by the shape of the rotor core 121, the round units 122 are protruded from the front ends of the protruded poles 121b of the rotor core 121 in the rotating direction W of the rotor core 121, instead of forming the resin formation units 40 (refer to FIG. 1) by filling the synthetic resin in the slots 111c of the stator core 111 as in the conventional art. Therefore, the switched reluctance motor prevents overheating in the rotation of the rotor core 121, and improves the noise characteristic by decreasing the BPF elements generated by the shape of the rotor core 121.

That is, this configuration can reduce the BPF elements by gradually decreasing the gaps G formed between the protruded poles 121b of the rotor core 121 and the protruded poles 111b of the stator core 111 in the rotation of the rotor core 121. In addition, this configuration can prevent overheating of the coils 112 and the rotor core 121 by sufficiently emitting heat generated in the rotation of the rotor core 121 by securing the air passages between the rotor core 121 and the stator core 111, thereby preventing reduction of efficiency and performance of the motor.

In the above embodiment of the present invention, the round units 122 are formed at the front ends of the protruded poles 121b of the rotor core 121 in the rotating direction W of the rotor core 121. However, it must be recognized that round units (not shown) can be formed at the rear ends of the protruded poles 121b of the rotor core 121 in the rotating direction W of the rotor core 121 in the same manner.

In the above embodiment of the present invention, the round units 122 are applied to the 2-phase switched reluctance motor. But, it is obvious that the round units 122 are applicable to a single phase, 3-phase or 4-phase switched reluctance motor.

As discussed earlier, in accordance with the present invention, the switched reluctance motor can reduce noise in the rotation of the rotor core by forming the round units at the front ends of the protruded poles of the rotor core in the rotation direction of the rotor core, and prevent overheating by securing the air passages by omitting the resin formation units.

Furthermore, the switched reluctance motor can restrict sharp variations of the torque by preventing sharp variations of the inductance.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The invention claimed is:

1. A switched reluctance motor, comprising:
   a stator core having a plurality of inwardly protruding poles at predetermined intervals;
   a plurality of coils wound around the plurality of inwardly protruding poles of the stator core, respectively; and
   a rotor core rotatably housed inside the stator core with a predetermined gap therebetween, and having a plurality of outwardly protruding poles along a radial direction and round portions that protrude, respectively, from front ends of each of the plurality of outwardly protruded poles of the rotor core, so that gaps formed, respectively, between the plurality of inwardly protruding poles of the stator core and the plurality of outwardly protruding poles of the rotor core are gradually reduced during rotation of the rotor core, wherein each of the round portions comprises a plurality of round portions having different curvatures, and wherein the plurality of round portions comprise:
      first round portions formed at the front ends of the plurality of protruding poles of the rotor core in a rotating direction of the rotor core; and
      second round portions formed to have a larger curvature than the first round portions, and connected to rear ends of the first round portions in the rotating direction of the rotor core.

2. The switched reluctance motor as claimed in claim 1, wherein the rotor core is rotated in one direction.

3. The switched reluctance motor as claimed in claim 1, wherein the rotor core is asymmetrical to a straight line passing through a rotation center thereof.

4. The switched reluctance motor as claimed in claim 2, wherein the round portions protrude along the rotating direction of the rotor core.

5. The switched reluctance motor as claimed in claim 1, wherein the round portions protrude in an elliptical shape.

* * * * *